US008202352B2

(12) United States Patent
Hu et al.

(10) Patent No.: US 8,202,352 B2
(45) Date of Patent: Jun. 19, 2012

(54) WETTED WALL CYCLONE SYSTEM AND METHODS

(76) Inventors: Shishan Hu, College Station, TX (US); Andrew R. McFarland, Houston, TX (US)

( * ) Notice: Subject to any disclaimer, the term of this patent is extended or adjusted under 35 U.S.C. 154(b) by 996 days.

(21) Appl. No.: 12/163,265

(22) Filed: Jun. 27, 2008

(65) Prior Publication Data

US 2009/0036288 A1 Feb. 5, 2009

Related U.S. Application Data

(60) Provisional application No. 60/946,806, filed on Jun. 28, 2007.

(51) Int. Cl.
*B01D 45/10* (2006.01)
*B04B 15/02* (2006.01)

(52) U.S. Cl. ....... 95/220; 210/512.1; 210/788; 209/722; 209/725; 96/316; 96/321; 96/413; 95/219; 73/863.12; 73/863.21; 55/392.1; 55/459.1

(58) Field of Classification Search .................... 95/219, 95/220; 96/316, 321, 413; 73/863.12, 863.21; 210/512.1, 788; 209/722, 725; 55/392.1, 55/459.1
See application file for complete search history.

(56) References Cited

U.S. PATENT DOCUMENTS 4,246,013 A 1/1981 Truhan et al.
4,940,473 A 7/1990 Benham
5,769,243 A 6/1998 McCarthy
6,217,636 B1 4/2001 McFarland
6,530,484 B1 3/2003 Bosman
2009/0193971 A1* 8/2009 McFarland et al. ............. 96/316

FOREIGN PATENT DOCUMENTS

JP 8052383 A 2/1996
JP 2007307475 A 11/2007
WO WO 2009017914 A2 * 2/2009

OTHER PUBLICATIONS

PCT/US2008/068611 International Preliminary Report for Patentability, Jun. 25, 2009.*
PCT/US2008/068611—Written Opinion of the International Searching Authority, mailed on Jun. 25, 2009.*
PCT/US2008/068611 International Search Report dated Jun. 25, 2009.

(Continued)

*Primary Examiner* — David A Reifsnyder
(74) *Attorney, Agent, or Firm* — Conley Rose, P.C.

(57) ABSTRACT

In an embodiment, a wetted wall cyclone comprises a cyclone body including an inlet end, an outlet end, an inner flow passage, and an inner surface defining an inner diameter. In addition, the wetted wall cyclone comprises a cyclone inlet tangentially coupled to the cyclone body. The cyclone inlet includes an inlet flow passage in fluid communication with the inner flow passage. Further, the wetted wall cyclone comprises a skimmer extending coaxially through the outlet end of the cyclone body. The skimmer comprises an upstream end disposed within the cyclone body, a downstream end distal the cyclone body, and an inner exhaust passage in fluid communication with the inner flow passage. Still further, the wetted wall cyclone comprises a first annulus positioned radially between the upstream end and the cyclone body having a radial width $W_1$ between 3% and 15% of the inner diameter of the cyclone body.

41 Claims, 5 Drawing Sheets

OTHER PUBLICATIONS

Moncla, Brandon Wayne; "A Study of Bioaerosol Sampling Cyclones"; Thesis dated Dec. 2004.
Phull, Manpreet Singh; "An Improved Wetted-Wall Bioaerosol Sampling Cyclone"; Thesis dated Aug. 2005.
PCT/US2009/030138 International Preliminary Report on Patentability, Jun. 15, 2010 (6 p.).
Hu, S., et al., "Numerical Performance Simulation of a Wetted Wall Bioaerosol Sampling Cyclone," Aerosol Science and Technology, 41:160-168, 2007 (9 p.).
Lapple, C.E., "Processes Use Many Collector Types," Department of Chemical Engineering, Ohio State University, May 1951, Chemical Engineering, 144-151 (8 p.).
Moore, Murray E., et al., "Performance Modeling of Single-Inlet Aerosol Sampling Cyclones," Environ. Sci. Technol., vol. 27, No. 9, 1993, 1842-1848 (7 p.).
Haglund, John S., "Design and Characterization of Two Wetted-Wall Cyclones for Bioaerosol Collection," Aerosol Technology Laboratory, Texas A&M University System, Scientific Conference on Obscuration and Aerosol Research, RDECOM and Battelle Memorial Institute, Aberdeen, Maryland, Jun. 22, 2005 (22 p.).
Seo, Y.J., et al., "Wetted Wall Bioaersol Sampling Cyclone," Aerosol Technology Laboratory, Texas A&M University, Applied Research Laboratories, University of Texas, SCOAR 2006, Jun. 28, 2006 (23 p.).
Wang, Jian-Jun, et al., "Effect of a Stick on the Gas Turbulence Structure in a Cyclone Separator," Aerosol Science and Technology, 39:713-721, 2005 (10 p.).
Gimbun, Jolius, et al., "Prediction of the Effects of Cone Tip Diameter on the Cyclone Performance," Aerosol Science 36, 1056-1065, 2005 (10 p.).
Kenny, L.C., et al., "A Direct Approach to the Design of Cyclones for Aerosol-Monitoring Applications,"J. Aerosol Sci., Vol. 13, No. 12, 1407-1420, 2000 (14 p.).
Kim, C.H., et al., "A New Collection Efficiency Model for Small Cyclones Considering the Boundary-Layer Effect," Aerosol Science 32, 251-269, 2001 (19 p.).
Griffiths, W.D., et al., "Computational Fluid Dynamics (CFD) and Empirical Modelling of the Performance of a Number of Cyclone Samplers," J. Aerosol Sci., vol. 27, No. 2, 281-304, 1996 (24 p.).
Hoekstra, A.J., et al., "An Experimental and Numerical Study of Turbulent Swirling Flow in Gas Cyclones," Chemical Engineering Science 54, 2055-2065, 1999 (11 p.).
Mathur, S.R., et al., "A Pressure-Based Method for Unstructured Meshes," Numerical Heat Transfer, Part B, 31:195-215, 1997 (22 p.).
Gu, Fang, et al., "CFD Simulation of Liquid Film Flow on Inclined Plates," Chem. Eng. Technol., 27, No. 10, 1099-1104, 2004 (6 p.).
Ataki, Adel, et al., "The Use of the VOF-Model to Study the Wetting of Solid Surfaces," Chem. Eng. Technol., 27, No. 10, 1109-1114 (6 p.).
Black, R.S., et al., "Development of the Wet Walled Cyclone Collector for the Joint Biological Point Detection System," Scientific Conferences on Obscuration and Aerosol Research, Battelle Memorial Institute, Jun. 25, 2002 (32 p.).
Hu, Shishan, et al., "Heat Transfer Study on a Bioaerosol Sampling Cyclone," Engineering Applications of Computational Fluid Mechanics, vol. 2, No. 3, 309-318, Sep. 2008 (10 p.).

* cited by examiner

WETTED WALL CYCLONE SYSTEM AND METHODS

CROSS-REFERENCE TO RELATED APPLICATIONS

This application claims benefit of U.S. Provisional Application Ser. No. 60/946,806 filed on Jun. 28, 2007, entitled "Wet Walled Cyclone System and Methods" which is hereby incorporated herein by reference in its entirety.

STATEMENT REGARDING FEDERALLY SPONSORED RESEARCH OR DEVELOPMENT

This invention was made with Government support from the Edgewood Chemical Biological Center of the U.S. Amy Research, Development and Engineering Command under Contract No. DAAD13-03-C-0050. The government may have certain rights in this invention.

BACKGROUND

1. Field of the Invention

The invention relates generally to apparatus, systems, and methods for separating and collecting particulate matter from a fluid. More particularly, the invention relates to a wetted wall cyclone and method of using the same for separating and collecting particular matter on a liquid layer. Still more particularly, the invention relates to a wetted wall cyclone and method of using the same for bioaerosol collection and concentration.

2. Background of the Invention

A cyclone separator is a mechanical device conventionally employed to remove and collect particulate matter or fine solids from a gas, typically air, by the use of centrifugal force. The gaseous suspension containing the fine particulate matter, often referred to as an "aerosol," is tangentially flowed into the inlet of a generally cylindrical cyclone body, resulting in a vortex of spinning airflow within the cyclone body. As the aerosol enters the cyclone, it is accelerated to a speed sufficient to cause the entrained particles with sufficient inertia to move radially outward under centrifugal forces until they strike the inner wall of the cyclone body.

In a wetted wall cyclone, the particulate matter moving radially outward is collected on a liquid film or layer that is formed on at least a portion of the inner surface of the cyclone wall. The liquid film is created by injecting the liquid into the air stream or into the cyclone body, where it is eventually deposited on the inner wall of the cyclone to form the liquid film. The liquid may be continuously injected or applied at periodic intervals to wash the inner surface of the cyclone wall. Shear forces caused by the cyclonic bulk airflow, which may be aided by the force of gravity, cause the liquid layer on the inner surface of the cyclone wall, as well as the particulate matter entrained therein, to move axially along the inner surface of the cyclone wall as a film or as rivulets towards a skimmer positioned downstream of the cyclone body. In wetted wall cyclone separators using water as the injected liquid, the suspension of water and entrained particulate matter is often referred to as a "hydrosol."

The liquid film or rivulets on the inner surface of the cyclone wall including the entrained particulate matter are separated from the bulk airflow by a skimmer from which the liquid film and entrained particles are aspirated from the cyclone body. The processed or "cleansed" air (i.e., the air remaining after the particulate matter has been separated and collected) exits the cyclone body and may be exhausted to the environment or subject to further separation. In this manner, at least a portion of the particulate matter in the bulk airflow is separated and collected in a more concentrated form that may be passed along for further processing or analysis. The concentration of the particulate matter separated from the bulk airflow can be increased by several orders of magnitude by this general process.

Wetted wall cyclone separators are used for a variety of separating and sampling purposes. For instance, wetted wall cyclones may be used as part of a bioaerosol detection system in which airborne bioaerosol particles are separated and collected in a concentrated form that can be analyzed to assess the characteristics of the bioaerosol particles.

The effectiveness or ability of the cyclone separator to separate and collect such particulate matter is often measured by the aerosol-to-hydrosol collection efficiency which is calculated by dividing the rate at which particles of a given size leave the cyclone separator in the hydrosol effluent stream by the rate of at which particles of that same size enter the cyclone in the bulk airflow or aerosol state.

In some conventional wetted wall cyclone, the liquid skimmer is connected to the cyclone body at a location where the cyclone body has an expanded or increased radius section. In such a diverging flow region, the cyclonic airflow tends to decelerate in the axial direction. As a result, the hydrosol liquid flowing along the inner wall of the cyclone body proximal the skimmer may collect and buildup in a relatively stagnant toroidal-shaped mass or ring-shaped bolus. Some of the hydrosol contained within such a bolus may be swept up and entrained in the cyclonic airflow, and exit the cyclone body along with such separated airflow, thereby bypassing the skimmer and associated aspiration. This phenomenon, often referred to as "liquid carryover", degrades the cyclone's separation and collection capabilities, and may significantly decrease the aerosol-to-hydrosol collection efficiency. For instance, Battelle Memorial Institute, Columbus, Ohio developed a wetted wall cyclone that was designed to operate at an air flow rate of 780 L/min and an effluent liquid flow rate of about 1.5 mL/min. The aerosol-to-hydrosol collection efficiency for particles in the size range of 1.5 to 6.5 μm aerodynamic diameter (AD) is about 60%; however, the unit frequently exhibits water carryover which significantly reduces the aerosol-to-hydrosol efficiency.

In some applications, it may be particularly desirable to control the temperature of the cyclone body, injected liquid, and hydrosol. For instance, the effectiveness of a wetted wall cyclone operated in a sub-freezing environment may be significantly reduced if the injected liquid and/or hydrosol begin to solidify or freeze. If the injected liquid and/or hydrosol begin to solidify, the ability to aspirate the hydrosol may become severely limited. As another example, for sampling bioaerosols, it is often preferred that the collected aerosol particles be preserved for subsequent analysis and study. The preservation of viability of biological organisms may necessitate a particular temperature range within the cyclone. However, many conventional wetted wall cyclones do not include any means or mechanism to control the temperature of the cyclone body, injected fluid, or hydrosol. The Battelle cyclone separator previously discussed employs an electric heating element to control the temperature of the cyclone body, however, it consumes relatively large amounts of power as the ambient temperature approaches and dips below freezing. For example, in environments having an ambient temperature below about −10° C., the Battelle cyclone requires about 350 watts of electrical power. Still further, the few conventional heated wetted wall cyclones generally employ a single heater to control the temperature of the cyclone body.

However, due to the air flow patterns within the cyclone body, variations in local turbulent heat transfer coefficients arise, which can result in temperature gradients along the cyclone body. In heated wetted wall cyclones employing a single heat source, hot spots and/or cold spots tend to develop on the cyclone body. Such hot spots may damage biological particles in the liquid state, and further, cold spots may cause partial solidification of the injected liquid in certain regions of the cyclone body.

Accordingly, there remains a need in the art for wetted wall cyclone separators capable of operation in sub-freezing environments. Such a wetted wall cyclone separator would be particularly well received if it allowed for variable temperature control of select areas of the cyclone body, and offered the potential for reduced water carryover and improved efficiency.

BRIEF SUMMARY OF SOME OF THE PREFERRED EMBODIMENTS

These and other needs in the art are addressed in one embodiment by a wetted wall cyclone. In an embodiment, the wetted wall cyclone comprises a cyclone body having a central axis and including an inlet end, an outlet end, and an inner flow passage extending therebetween. The cyclone body has an inner surface defining an inner diameter. In addition, the wetted wall cyclone comprises a cyclone inlet tangentially coupled to the cyclone body proximal the inlet end. The cyclone inlet includes an inlet flow passage in fluid communication with the inner flow passage of the cyclone body. Further, the wetted wall cyclone comprises a skimmer extending coaxially through the outlet end of the cyclone body. The skimmer comprises an upstream end disposed within the cyclone body, a downstream end distal the cyclone body, and an inner exhaust passage extending between the first and the second ends. The inner exhaust passage is in fluid communication with the inner flow passage of the cyclone body. Still further, the wetted wall cyclone comprises a first annulus positioned radially between the upstream end and the cyclone body and having a radial width $W_1$ between 3% and 15% of the inner diameter of the cyclone body.

Theses and other needs in the art are addressed in another embodiment by a wetted wall cyclone. In an embodiment, the wetted wall cyclone comprises a cyclone body having a central axis and including an inlet end, an outlet end, and an inner flow passage extending therebetween. In addition, the wetted wall cyclone comprises a cyclone inlet tangentially coupled to the cyclone body proximal the inlet end. The cyclone inlet includes an inlet flow passage in fluid communication with the inner flow passage of the cyclone body. Further, the wetted wall cyclone comprises a skimmer extending coaxially through the outlet end of the cyclone body. The skimmer comprises an upstream end disposed within the cyclone body, a downstream end distal the cyclone body, and an inner exhaust passage extending between the first and the second ends. The inner exhaust passage is in fluid communication with the inner flow passage of the cyclone body. The skimmer also comprises a material having a thermal conductivity greater than 110 $W/m^2$ K. Still further, the wetted wall cyclone comprises a first heater coupled to the outside of the cyclone body proximal the inlet end, and a second heater coupled to the outside of the skimmer.

Theses and other needs in the art are addressed in another embodiment by a method of separating particles having a size within a predetermined range of aerodynamic diameters from an aerosol. In an embodiment, the method comprises flowing the aerosol into a wetted wall cyclone. The wetted wall cyclone comprises a cyclone body having a central axis and including an inlet end, an outlet end, and an inner flow passage extending therebetween, and also comprises a cyclone inlet tangentially coupled to the cyclone body proximal the inlet end. The cyclone inlet includes an inlet flow passage in fluid communication with the inner flow passage of the cyclone body. In addition, the method comprises injecting a collection liquid into the inlet flow passage. Further, the method comprises atomizing the collection liquid into a mist. Still further, the method comprises entraining a first portion of the particulate matter in the collection liquid to form a hydrosol. Moreover, the method comprises heating the cyclone body with a first heater coupled to the cyclone body and heating the skimmer with a second heater coupled to the skimmer. In addition, the method comprises controlling the temperature of the cyclone body and the skimmer independent of each other.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

For a detailed description of the preferred embodiments of the invention, reference will now be made to the accompanying drawings in which.

DETAILED DESCRIPTION OF SOME OF THE PREFERRED EMBODIMENTS

Figure 1:
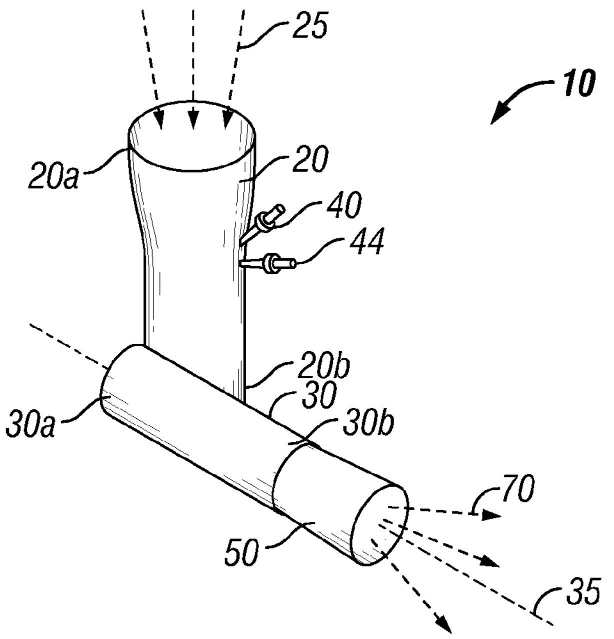
FIG. 1 is perspective view of an embodiment of a wetted wall cyclone system in accordance with the principles described herein.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components.

As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms “including” and “comprising” are used in an open-ended fashion, and thus should be interpreted to mean “including, but not limited to . . . .” Also, the term “couple” or “couples” is intended to mean either an indirect or direct connection. Thus, if a first device couples to a second device, that connection may be through a direct connection, or through an indirect connection via other devices and connections.

Figure 2:
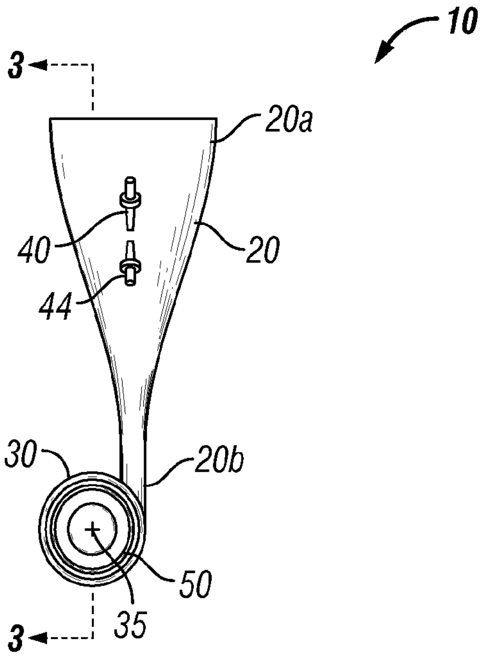
FIG. 2 is an end view of the wetted wall cyclone system of FIG. 1.
Figure 3:
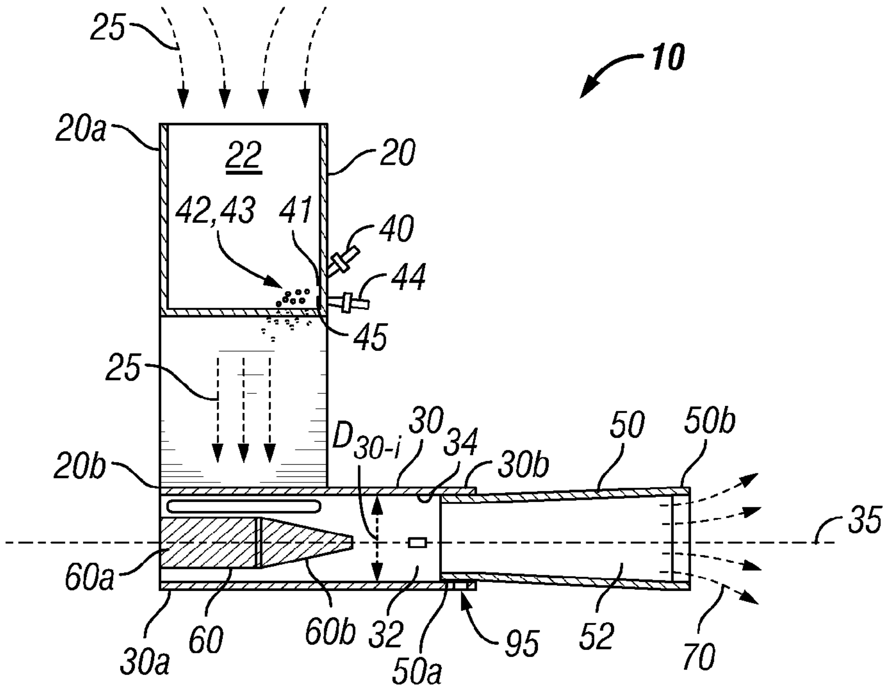
FIG. 3 is a cross-sectional view of the wetted wall cyclone system of FIG. 1.

Referring now to FIGS. 1-3, an embodiment of a wetted wall cyclone 10 constructed in accordance with the principles described herein is shown. Wetted wall cyclone 10 comprises an inlet conduit 20, a cyclone body 30, a collection liquid collection liquid injector 40, and a skimmer 50. As will be explained in more detail below, inlet conduit 20, cyclone body 30, and skimmer 50 are in fluid communication.

Cyclone body 30 has a central or longitudinal axis 35 and includes an upstream or inlet end 30*a*, a downstream or outlet end 30*b*, and an inner flow passage 32 extending between ends 30*a, b*. Inlet conduit 20 is coupled to cyclone body 30 proximal inlet end 30*a*, and skimmer 50 is coaxially coupled to cyclone body 30 at outlet end 50*b*. Flow passage 32 is defined by a generally cylindrical inner surface 34 defining an inner diameter $D_{30-i}$ for cyclone body 30. In this embodiment, inner diameter $D_{30-i}$ is substantially uniform or constant along the axial length of cyclone body 30. As used herein, the terms “axial” and “axially” may be used to refer to positions, movement, and distances, generally parallel to the central axis (e.g., central axis 35), whereas the terms “radial” and “radially” may be used to refer to positions, movement, and distances generally perpendicular to the central axis (e.g., central axis 35).

As best shown in FIG. 3, cyclone body 30 also includes a vortex finder 60 that extends coaxially from inlet end 30*a* into flow passage 32. Vortex finder 60 is an elongate, generally cylindrical member having a fixed end 60*a* fixed to inlet end 30*a* of cyclone body 30, and a free end 60*b* extending into flow passage 32. In this embodiment, free end 60*b* comprises a conical or pointed tip. Vortex finder 60 is configured and positioned to enhance the formation of a vortex and resulting cyclonic fluid flow within inner flow passage 32.

Referring still to FIGS. 1-3, inlet conduit 20 has a free or inlet end 20*a* distal cyclone body 30, a fixed end 20*b* coupled to cyclone body 30 proximal first end 30*a*, and an inlet flow passage 22 extending between ends 20*a, b*. Inlet conduit 20 may be integral with cyclone body 30 or manufactured separately and connected to cyclone body 30 by any suitable means, including, without limitation, welding, adhesive, interference fit, or combinations thereof.

Flow passage 22 of inlet conduit 20 is in fluid communication with flow passage 32 of cyclone body 30. In particular, the fluid which contains particulate matter to be separated and collected by cyclone 10, referred to herein as bulk inlet airflow or aerosol 25, enters cyclone 10 via inlet end 20*a* and inlet flow passage 22. Aerosol 25 typically comprises air, the particulate matter to be separated from the air, as well as some particles with relatively low inertia that may be permitted to exit cyclone 10 without being separated and collected. As best shown in FIGS. 1 and 2, inlet conduit 20 is “tangentially” coupled to the side of cyclone body 30 such that aerosol 25 flows through inlet flow passage 22 tangentially (i.e., in a direction generally tangent to the circumference of inner surface 34) into inner flow passage 32 of cyclone body 30. This configuration facilitates the formation of a spiraling or cyclonic fluid flow within inner flow passage 32.

Referring still to FIGS. 1-3, collection liquid injector 40 is coupled to inlet conduit 20 and includes an injection tip 41 that extends into, and communicates with, inlet flow passage 22. Collection liquid injector 40 delivers a stream of collection liquid 42 through tip 41 into flow passage 22 and aerosol 25 flowing therethrough. As will be described in more detail below, collection liquid 42 forms a mist of droplets, which in turn, form a film of liquid on part of the inner surface of the cyclone 34. The film serves as a collection surface for the relatively high inertia particles contained in aerosol 25, thereby separating such particles from the gaseous phase of aerosol 25 (e.g., the air).

Collection liquid 42 may be supplied to injector 40 by any suitable means including, without limitation, conduits, supply lines, pumps, or combinations thereof. Further, collection liquid injector 40 may be configured and controlled for continuous or periodic injection of collection liquid 42 into cyclone 10. In general, collection liquid 42 may comprise any liquid suitable for entraining particulate matter including, without limitation, water, a water based mixture (e.g., a water-glycerol mixture), or combinations thereof. Collection liquid 42 preferably comprises a mixture of water and a small amount of suitable surfactant (e.g., Polysorbate 20, also referred to as Tween 20) added to it to enhance wetting of the collection surface (e.g., inner surface 34) and retention of particulate matter. More specifically, collection fluid 42 preferably comprises a water-surfactant mixture comprising about 0.005% to 0.5% surfactant by volume, and more preferably 0.01% to 0.1% surfactant by volume. When separating and collecting biomaterials or bio-organisms, the collection liquid (e.g., collection liquid 42) may include egg ovalbumin, which serves as a surfactant and coating agent that is believed to enhance the preservation of the bio-organisms.

Referring still to FIGS. 1-3, a compressed gas injector 44 is also coupled to inlet conduit 20 and includes an injection tip 45 that extends into, and is in communication with, inlet flow passage 22 proximal collection liquid injection tip 41. Compressed gas injector 44 delivers a stream or blast of compressed gas into flow passage 22 and the stream of collection liquid 42. More specifically, as collection liquid 42 is injected from tip 41, it is impacted by the compressed gas from tip 45, thereby atomizing collection liquid 42 in flow passage 22 to form a mist 43 that is swept up by aerosol 25 and transported through inlet flow passage 22 to inner flow passage 32 of cyclone body 30. The compressed gas may be supplied to injector 44 by any suitable means including, without limitation, conduits, supply lines, pumps, or combinations thereof. Further, compressed gas injector 44 may be configured and controlled for continuous or periodic injection of compressed gas into cyclone 10. In general, the compressed gas may comprise any suitable gas including, without limitation, compressed air, compressed nitrogen, or combinations thereof.

In this embodiment, collection liquid 42 is injected and atomized within flow passage 22, and is carried to cyclone body 30 by aerosol 25. However, in general, the collection liquid (e.g., collection liquid 42) may be injected and/or atomized at any suitable location within the wetted wall cyclone (e.g., cyclone 10) including, without limitation, injection of the collection liquid into the aerosol stream proximal the juncture of the cyclone inlet and the cyclone body.

Referring still to FIGS. 1-3, skimmer 50 extends partially into outlet end 30*b* of cyclone body 30. More specifically, skimmer 50 has a separation end 50*a* disposed in cyclone body 30, a free end 50*b* distal cyclone body 30, and an inner exhaust or outlet passage 55 extending between ends 50*a, b*. Outlet passage 55 is in fluid communication with flow passage 32.

Figure 4:
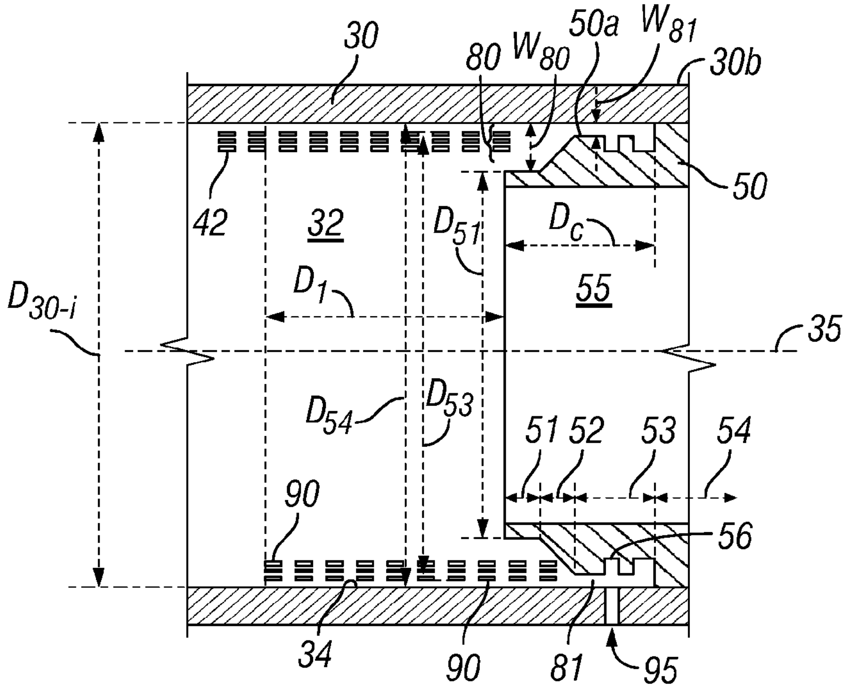
FIG. 4 is an enlarged partial cross-sectional view of the connection between the cyclone body and the skimmer of the wetted wall cyclone system of FIG. 1.

The gaseous component(s) of aerosol 25 (e.g., air) and the relatively low inertia particulate matter in aerosol 25 not entrained in collection liquid 42, collectively referred to herein as bulk outlet airflow 70, exit cyclone 10 via exhaust passage 55. As will be explained in more detail below, the relatively high inertia particulate matter in aerosol 25 is separated from aerosol 25 and entrained within the layer or rivulets of collection liquid 42 formed along inner surface 34, and thus, does not exit cyclone 10 via exhaust passage 55. Rather, as shown in FIG. 4, the combination of collection liquid 42 and the entrained particulate matter separated from aerosol 25, collectively referred to herein as a hydrosol 90, exits cyclone 10 via an aspiration port 95 in cyclone body 30 proximal outlet end 30*b*. It should be appreciated that during the course of transit of collection liquid 42 through cyclone 10 from injector 40 to aspiration port 95, there may be some loss of collection liquid 42 due to evaporation or gain in collection liquid 42 by condensation. And further, the local flow rate of collection liquid 42 at various points within cyclone 10 may vary somewhat due to evaporation or condensation.

Referring still to FIGS. 1-3, a pressure differential between exhaust passage 55 and inlet flow passage 22 facilitates the flow of fluids through cyclone 10 from inlet conduit 20 through cyclone body 30 to skimmer 50. The pressure differential may be created by any suitable device including, without limitation, a fan, pump, a blower, suction device, or the like. Such a device is typically positioned downstream of cyclone 10, but in some applications, may be positioned upstream of cyclone 10. Alternatively, the bulk airflow 25 in flow passage 22 may be pressurized relative to exhaust passage 55 of skimmer 50, tending to force fluid flow through cyclone 10.

Referring now to FIG. 4, an enlarged cross-sectional view of the region of overlap between cyclone body 30 and skimmer 50 is shown. Moving axially along skimmer 50 from separation end 50*a*, the portion of skimmer 50 disposed within cyclone body 30 includes an upstream or leading section 51, a transition section 52, a recessed or intermediate section 53, and a downstream or coupling section 54. Leading section 51 extends axially from separation end 50*a* to transition section 52, transition section 52 extends axially from leading section 51 to recessed section 53, recessed section 53 extends from transition section 52 to coupling section 54, and coupling section 54 extends axially from recessed section 53. Recessed section 53 meets coupling section 54 at an axial distance $D_c$ measured from separation end 50*a*.

Sections 51, 52, 53 are each radially spaced from inner surface 34, whereas coupling section 54 engages inner surface 34, thereby coupling skimmer 50 to cyclone body 30. The coupling between skimmer 50 and cyclone body 30 between coupling section 54 and inner surface 34 may be achieved by any suitable means including, without limitation, mating threads, welded joint, an interference fit, or combinations thereof. Preferably a 360° fluid tight seal is formed between coupling section 54 of skimmer 50 and inner surface 34 of cyclone body 30 along at least a portion of the axial length at which they are connected. In some embodiments, a seal or O-ring may be provided between inner surface 34 and skimmer 50 to form such a fluid tight seal.

Leading section 51 has an outer diameter $D_{51}$, recessed section 53 has an outer diameter $D_{53}$ that is greater than diameter $D_{51}$, and coupling section 54 has an outer diameter $D_{54}$ that is greater than diameter $D_{53}$. Transition section 52 has a generally frustoconical or sloped outer surface that transitions from diameter $D_{51}$ to diameter $D_{53}$. Thus, the outer diameter of skimmer 50 at any point along transition section 52 is generally between diameter $D_{51}$ to diameter $D_{53}$. As previously described, sections 51, 53 are radially spaced from inner surface 34, and thus, outer diameters $D_{51}$, $D_{53}$ are each less than inner diameter $D_{30\text{-}i}$. Coupling section 54 engages cyclone body 30, and thus, diameter $D_{54}$ is substantially the same or slightly less than the inner diameter $D_{30\text{-}i}$ of cyclone body 30.

Referring still to FIG. 4, the outer surface of recessed section 53 includes an annular groove or recess 56 axially spaced from leading section 51. Annular groove 56 is axially aligned with and opposes aspiration port 95, which extend radially through cyclone body 30 in the region of overlap between cyclone body 30 and skimmer 50.

As previously described, leading section 51 is radially spaced from inner surface 34, resulting in the formation of an annulus 80 between leading section 51 and cyclone body 30. Annulus 80 is in fluid communication with flow passage 32 and provides a flow path for the hydrosol 90 moving axially along inner surface 34. The radial width $W_{80}$ of annulus 80 depends, at least in part, on the size of cyclone 10 and the expected aerosol flow rates and velocities, but is preferably sufficient to allow passage of a hydrosol 90 that moves axially along inner surface 34, while allowing sufficient shear forces to be exerted on hydrosol 90 by spiraling aerosol 25 within inner flow passage 32. In particular, the radial width $W_{80}$ of annulus 80 is preferably between 3% and 15% of the inside diameter $D_{30\text{-}i}$, and more preferably between 4% and 10% of the inside diameter $D_{30\text{-}i}$. For most applications, the radial width $W_{80}$ of annulus 80 is preferably greater than 0.03 inches.

Further, as previously described, recessed section 53 is radially spaced from inner surface 34, resulting in the formation of an annulus 81 between recessed section 51 and cyclone body 30. Annulus 81 is in fluid communication with annulus 80, inner flow passage 32, and aspiration port 95. Hydrosol 90 moving axially along inner surface 34 moves through annulus 80 and annulus 81 to aspiration port 95 where it is collected. The radial width $W_{81}$ of annulus 81 depends, at least in part, on the size of cyclone 10 and the expected aerosol flow rates and velocities, but is preferably sufficient to allow passage of a hydrosol 90 that moves axially along inner surface 34, while allowing sufficient shear forces to be exerted on hydrosol 90 by spiraling aerosol 25 within inner flow passage 32. In particular, the radial width $W_{81}$ of annulus 81 is preferably between 0.15% and 2.5% of the inside diameter $D_{30\text{-}i}$. For most applications, the radial width $W_{81}$ of annulus 81 is preferably between about 0.003 inches and 0.010 inches.

Referring now to FIGS. 3 and 4, to operate wetted wall cyclone 10, a pressure differential is created between inlet conduit 20 and skimmer 50. In particular, exhaust passage 55 of skimmer 50 is preferably maintained at a lower pressure than inlet passage 22 of inlet conduit 20, thereby facilitating the flow of aerosol 25 into inlet conduit 20 and through inlet passage 22 to inner flow passage 32. Aerosol 25 flows tangentially into flow passage 32 and is partially aided by vortex finder 60 to form a cyclonic or spiral flow pattern within inner flow passage 32 of cyclone body 30. As aerosol 25 spirals within flow passage 32, it also moves axially towards skimmer 50 under the influence of the pressure differential across cyclone 10.

Periodically, or continuous with the flow of aerosol 25, collection liquid injector 40 introduces collection liquid 42 into inlet passage 22. Simultaneous with injection of collection liquid 42, or shortly thereafter, compressed gas from gas injector 44 impacts the stream of collection liquid 42 to form a mist 43 of collection liquid 42 in passage 22. The mist 43 is swept up and carried by the flow of aerosol 25 through inlet passage 22 to flow passage 32 of cyclone body 30. Depending on the orientation of cyclone 10, gravity may also aid the movement of mist 43 into flow passage 32. The individual droplets of collection liquid 42 in mist 43 tend to move radially outward towards inner surface 34 as a result of their inertia and the curvature of inner surface 32. Movement of droplets towards surface 34 is assisted by centrifugal force. As droplets of collection liquid 42 strike inner surface 34, they form a liquid film on a portion of inner surface 34. The film on inner surface 34 may have a radial thickness on the order of a few micrometers. The cyclonic and axial movement of aerosol 25 through flow passage 32 exerts shear forces on the film of collection liquid 42, thereby urging collection liquid 42 axially along inner surface 34 towards skimmer 50. Through the action of surface tension in the liquid and shear forces from the gas phase of the aerosol 25, the liquid film may break into rivulets, which have a thickness on the order of tens of micrometers, that flow along inner surface 34 towards annulus 80.

Similar to collection liquid 42, upon entry into flow passage 34, the particulate matter in aerosol 25 having sufficient inertia begin to separate from the gaseous phase of aerosol 25 and move radially towards inner surface 34 and collection liquid 42 disposed along inner surface 34. Eventually these particles strike collection liquid 42 disposed on inner surface 34, and become entrained in the collection liquid 42, thereby forming a layer or plurality of rivulets of hydrosol 90. The remaining relatively lower inertia particles and the gaseous phase of aerosol 25 continue their cyclonic flow in flow passage 32 as they move axially towards skimmer 50 and eventually exits cyclone 10 via exhaust passage 55 as bulk outlet airflow 70. Thus, the relatively large particles and collection liquid 42 tend to accumulate on inner surface 34 as hydrosol 90, while the relatively small particles in aerosol 25 and the gaseous phase of aerosol 25 forming bulk outlet airflow 70 tend to remain radially inward of collection liquid 42, but also move axially toward skimmer 50. In this manner, particulate matter in aerosol 25 with sufficient inertia is separated from aerosol 25 and captured in collection liquid 42 to form hydrosol 90.

In some applications of cyclone 10, high inertia, larger particles are defined as particles having sizes greater than or equal to about 1 μm aerodynamic diameter, while smaller, low inertial particles are defined as particles having sizes less than about 1 micrometer aerodynamic diameter. However, it should be appreciated that the size and geometry of the wetted wall cyclone and the volumetric flow rate of the aerosol through the wetted wall cyclone may be varied to increase or decrease the size of the particles separated by the wetted wall cyclone (e.g., cyclone 10). For example, a particular sized and mass particle may have insufficient inertia for separation at a first aerosol volumetric flow rate, but have sufficient inertia for separation at a second aerosol volumetric flow rate that is greater than the first aerosol volumetric flow rate.

As previously described, the particulate matter separated from aerosol 25 becomes entrained within collection liquid 42 along inner surface 34 to form hydrosol 90. Hydrosol 90 moves axially along inner surface 34 towards skimmer 50 as a film or a plurality of rivulets. Similar to collection liquid 42, the axial movement of collection liquid 42 and hydrosol 90 along inner surface 34 of cyclone body 30 is primarily driven by shear forces exerted by the gas phase of the aerosol 25 as it spirals inside cyclone body 30 towards skimmer 50. Depending on the orientation of cyclone 10, gravity may also be leveraged to enhance the axial flow of collection liquid 42 and hydrosol 90 along inner surface 34.

Hydrosol 90 continues to move axially along inner surface 34 through annulus 80 and annulus 81 into annular groove 56. Suction is provided to aspiration port 95 to collect hydrosol 90 from annular groove 56. Thus, hydrosol 90 collected in annular groove 56 is extracted from cyclone 10 via aspiration port 95. Following collection, hydrosol 90 may be passed along for further processing or analysis. As compared to the concentration of particulate matter in aerosol 25, the concentration of particulate matter in hydrosol 90 is significantly greater. In some embodiment of cyclone 10, the effluent flow rate of hydrosol 90 through aspiration port 95 is about one millionth that of the aerosol 25 inflow rate. Consequently, in such embodiment, the concentration of particulate matter in hydrosol 90 is significantly greater than the concentration of particulate matter in aerosol 25.

In many conventional wetted wall cyclones, the cyclone body includes an expanded section adapted to receive the liquid skimmer. The expanded geometry proximal the liquid skimmer results in a diverging flow region and localized airflow deceleration in the axial direction, which may result in a buildup of a relatively stagnant toroidal-shaped mass of the hydrosol proximal the liquid skimmer and associated liquid carryover. To the contrary, in this embodiment of cyclone 10, the inner diameter $D_{30\text{-}i}$ of cyclone body 30 is substantially uniform. As a result, divergent flow, and associated axial flow deceleration, within flow passage 32 is reduced as compared to some conventional wetted wall cyclones that include an expanded section proximal the leading edge of the skimmer. By reducing the potential for axial flow deceleration, the likelihood of hydrosol stagnation proximal the skimmer is reduced. In this manner, embodiments of cyclone 10 offer the potential for reduced liquid carryover, an increased aerosol-to-hydrosol collection efficiency, and an increased concentration factor as compared to some conventional wetted wall cyclones. For example, embodiments of cyclone 10 offer the potential for aerosol-to-hydrosol collection efficiencies greater than about 75%, and a concentration factor of between 500,000 and 1,500,000 when cyclone 10 is operated with continuous injection of collection liquid 42. As described in more detail below in Example 1, an embodiment of the wetted wall cyclone separator 10 provides aerosol-to-hydrosol efficiency values of about 80% and concentration factors of about 750,000 for the particle size range of 1-8 μm AD. Other embodiments of wetted wall cyclone separator 10 offer the potential to achieve even higher aerosol-to-hydrosol collection efficiencies (on the order of 90%) and concentration factors between 500,000 and 1,500,000. As used herein, the phrase "aerosol-to-hydrosol collection efficiency" may be used to refer to the ratio of the rate at which particles of a given size leave the cyclone separator in the hydrosol effluent stream to the rate of at which particles of that same size enter the cyclone in the aerosol state. Further, as used herein, the phrase "concentration factor" may be used to refer to the ratio of the number concentration of aerosol particles of a given size (e.g., aerodynamic diameter) in the effluent hydrosol (e.g., effluent hydrosol 95) to the number concentration of aerosol particles of that same size in the inlet aerosol (e.g., aerosol 25). The number concentration of particles of a given size in the aerosol is the number of particles of that size per unit volume of aerosol (e.g., 10 particles per liter of aerosol, 25 cells per liter of aerosol, etc.), and the number concentration of particles of a given size in the hydrosol is the number of particles of that size per unit volume of hydrosol (e.g., 15 particles per liter of hydrosol, 30 cells per liter of hydrosol, etc.). The number concentration of particles of a given size in the aerosol may be calculated by dividing the rate of at which particles of that same size enter the cyclone in the aerosol state by the aerosol flow rate, and the number concentration of particles of a given size in the hydrosol may be calculated by dividing the rate at which particles of a given size leave the cyclone separator in the hydrosol effluent stream by the hydrosol flow rate.

Although cyclone body 30 is described as having a substantially uniform inner diameter $D_{30-i}$ along its entire axial length, a uniform inner diameter in the cyclone body (e.g., cyclone body 30) is particular preferred within an axial distance $D_1$ of skimmer 50, where distance $D_1$ is at least 50% of the inner diameter $D_{30-i}$ of cyclone body 30. Further, in other embodiments, the cyclone body (e.g., cyclone body 30) may include a slight convergence or divergence. However, to reduce the likelihood of axial flow deceleration and associated liquid carryover, the inner surface of the cyclone body (e.g., inner surface 34) is preferably oriented at an angle $\alpha$ (FIG. 4) that is less than or equal to about +/−6° relative to the central axis of the cyclone body (e.g., central axis 35). Negative angles of $\alpha$ (converging), particularly within the distance $D_1$ would provide acceleration of the gas phase of the aerosol 25 and thereby reduce the potential for liquid carryover. It should be appreciated that angle $\alpha$ is about zero for cyclone bodies with a substantially uniform diameter.

It should also be appreciated that leading section 51 offers a physical barrier disposed radially between hydrosol 90 moving axially within annulus 80 and bulk outlet airflow 70 in exhaust passage 55, while permitting continued shearing action to be exerted on hydrosol 90 by the spiraling aerosol 25 and bulk outlet airflow 70. More specifically, annulus 80 and its increased radial width $W_{80}$, as compared to annulus 81 and its radial width $W_{81}$, allows continued shearing action on hydrosol 90 while leading section 51 simultaneously shields hydrosol 90 from the bulk outlet airflow 70 in exhaust passage 55. It is believed that this feature also contributes to reduced liquid carryover, and increased aerosol-to-hydrosol collection efficiency.

In some cases, it may be desirable to employ a wetted wall cyclone (e.g., cyclone 10) in a sub-freezing environment. For instance, sampling and analysis of air for airborne biological agents or chemical agents may be desirable in locations subject to below freezing temperatures. However, if the collection liquid or the hydrosol containing the collection liquid and entrained particulate matter begin to solidify, the effectiveness of the wetted wall cyclone may decrease significantly. Consequently, for use in near freezing and sub-freezing environments, the collection liquid (e.g., collection liquid 42) preferably includes a compound, such as a glycerol or glycerol based compound, that decreases the freezing point of the collection liquid. Glycerol reduces the freezing point of the collection liquid, tends to reduce evaporative losses, and is not believed to have significant deleterious effects on some spores and vegetative cells entrained in the hydrosol. A water-glycerol mixture used as the collection liquid preferably comprises about 30% glycerol by volume, which has a freezing point of about −9.5° C. Further, in embodiments employing compressed gas atomization to create a mist (e.g., mist 43) of collection liquid (e.g., collection liquid 42), it is preferred that the droplets forming mist 43 are sufficiently large such that they will not freeze when they contact the aerosol (e.g., aerosol 25). In general, as the ambient temperature of the environment in which cyclone 10 is disposed decreases, the size of the droplets of collection liquid 42, formed by injectors 40, 44, necessary to prevent freezing, increases. To preclude freezing of droplets in ambient temperatures as cold as about −40° C., the droplets preferably have a diameter of at least 40 μm when atomized from a bulk liquid at 20° C. It should be appreciated that for substantially spherical objects of unit specific gravity (e.g., spherical droplets of water), the aerodynamic diameter is the same as the actual diameter of the object.

If the droplets are formed from atomization of a water-glycol mixture, the size of droplet necessary to preclude freezing is smaller. In addition to forming relatively large droplets of collection liquid fluid, and/or atomizing a glycol-water mixture, it may be desirable to increase the temperature of the wetted wall cyclone system to reduce the likelihood of solidification of collection liquid and hydrosol. However, in applications involving collection and analysis of biological materials or organisms, preferably the added thermal energy does not create hot spots that could potentially damage such biological materials.

Figure 5:
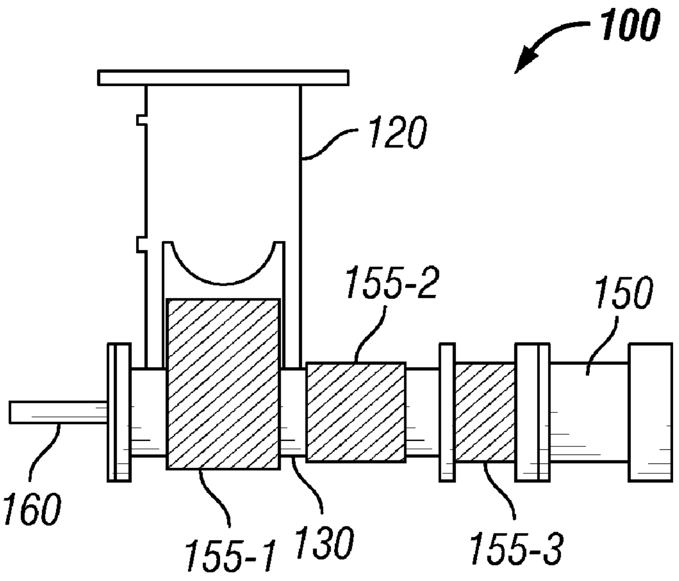
FIG. 5 is a side view of another embodiment of a wetted wall cyclone system in accordance with the principles described herein and including a plurality of heaters.
Figure 6:
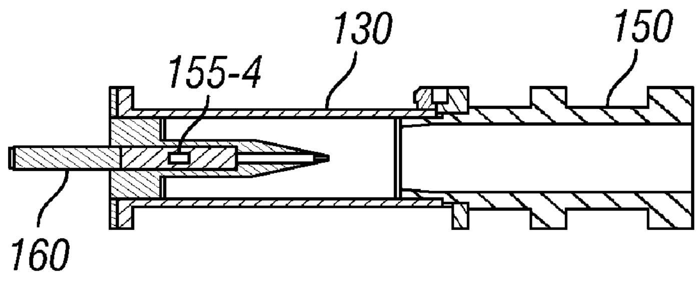
FIG. 6 is a partial cross-sectional view of the cyclone body and the skimmer of the wetted wall cyclone system of FIG. 5.

Referring now to FIGS. 5 and 6, another embodiment of a wetted wall cyclone 100 is shown. Cyclone 100 is substantially the same as system 10 previously described. Namely, cyclone 100 comprises a cyclone inlet 120, a cyclone body 130, a liquid injector (not shown), a vortex finder 160, and a skimmer 150. However, in this embodiment, a plurality of heaters 155-1, 155-2, 155-3 are coupled to specific locations along the outside of cyclone 100, and a heater 155-4 is provided in vortex finder 160. In general, the heaters (e.g., heaters 155-1, 155-2, 155-3, 155-4) may comprise any suitable device capable of providing thermal energy to cyclone 100. Preferably each heater comprises an electric heating device with an adjustable heat output/intensity (i.e., the thermal output of each heater can be individually controlled and adjusted).

Heater 155-1 extends around the outer surface of cyclone body 130 and over the lower portion of cyclone inlet 120; heater 155-2 is positioned around the outer surface of cyclone body 130 proximal skimmer 150; heater 155-3 is disposed about skimmer 150 proximal cyclone body 130; and heater 155-4 extends coaxially into vortex finder 160. Consequently, by adjusting the thermal output of each heater 155-1, 155-2, 155-3, 155-4 independently, the temperature of cyclone body 130 proximal cyclone inlet 120, the temperature of cyclone body 130 proximal skimmer 150, the temperature of skimmer 150 proximal cyclone body 130, and the temperature of vortex finder 160, respectively, may be independently controlled via conductive heat transfer. Likewise, the temperatures of the fluids and particulate matter (e.g., aerosol, hydrosol, collection liquid, particulate matter, bulk outlet flow, etc.) in proximity to the inner walls within each of these different regions of cyclone 100 may be independently controlled via conductive and convective heat transfer.

Without being limited by this or any particular theory, the fluids and particulate matter moving through cyclone 100 attain different local velocities in different regions of cyclone 100 due to the relatively complex geometry of cyclone 100 and resulting flow patterns. The variations in local velocities within cyclone 100 result in different local turbulent heat transfer coefficients in the different regions of cyclone 100. In some conventional wetted wall cyclones that include only a single heater to control the temperature of wetted wall cyclone, hot spots and/or cold spots can develop on the cyclone body due to the varying local turbulent heat transfer coefficients. Such hot or cold spots may damage biological agents or bio-organism within the hydrosol, or result in solidification of the injected liquid or hydrosol along certain regions of the cyclone body. However, embodiments of wetted wall cyclone 100 include a plurality of heaters (e.g., heaters 155-1, 155-2, 155-3, 155-4) positioned at different regions of cyclone 100 that offer the potential to preclude these problems. Heaters 155 may be independently controlled and adjusted to obtain the desired temperature within each particular region of cyclone 100 (e.g., at cyclone inlet 120, at vortex finder 160, within cyclone body 130, within skimmer 150, etc.), thereby offering the potential to reduce the formation of hot spots and cold spots within cyclone 100, and also offer the potential for effective and efficient use in sub-freezing environments. For instance, embodiments of cyclone 100 offer the potential for effective use at temperatures as low as −40° C. Preferably, the heaters (e.g., heaters 155-1, 155-2, 155-3, 155-4) provide sufficient thermal energy to eliminate cold spots with temperatures at or below the freezing point of the collection liquid (e.g., collection liquid 42), but do not generate hot spots with temperatures greater than about 50° C., which may otherwise damage bio-organisms. Still further, it is believed that incorporation multiple heaters, and their independent control, may offer the potential for reduced energy consumption for cyclone 100 as compared to a conventional wetted wall cyclone system employing a single relatively large heater.

Although four heaters 155 are shown in FIGS. 5 and 6, in general, any number of heaters (e.g., heaters 155) may be employed to independently control different regions of wetted wall cyclone 100. In addition, in some embodiments, sensors and/or a control loop feedback system may also be employed to independently monitor and control the temperature of each portion of cyclone 100 and fluids contained therein.

Figure 7:
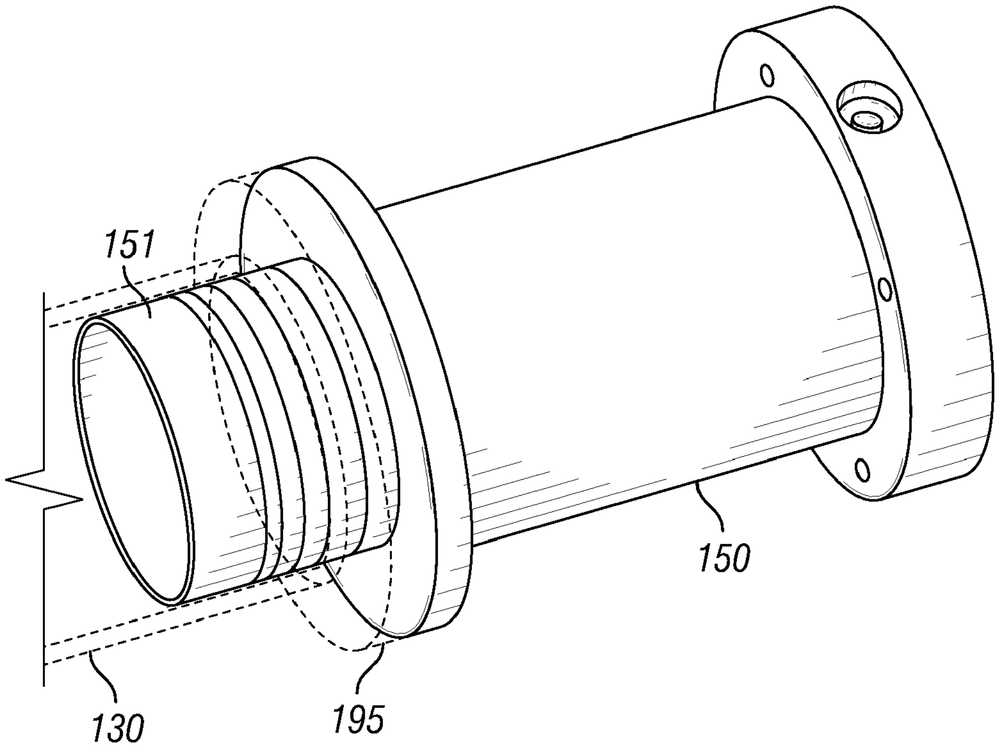
FIG. 7 is a partial perspective view of the cyclone body and the skimmer of the wetted wall cyclone system of FIG. 5.

Referring now to FIG. 7, a partial perspective view of wetted wall cyclone 100 previously described is shown. In particular, skimmer 150 and cyclone body 130 (shown in phantom) coupled to skimmer 150 are shown. Skimmer 150 includes a reduced diameter leading section 151 substantially the same as leading section 51 previously described. Leading section 151 extends into cyclone body 130, but is radially offset from cyclone body 130, resulting in the formation of an annulus therebetween.

Controlling the temperature of leading section 151 may be of particularly important because the physical separation and collection of hydrosol 90 and remaining bulk outlet airflow 70 occurs in the general region of leading section 151. However, controlling the temperature of leading section 151*a* heater coupled to the outside of cyclone 100 (e.g., heater 155-2, 155-3) may be challenging because leading section 151 is thermally shielded by cyclone body 130 and the annulus between cyclone body 130 and leading section 151. However, contrary to some conventional wetted wall cyclone systems including skimmers made of a relatively low thermal conductivity materials, in this embodiment, skimmer 150, including leading section 151, preferably comprise a material with a thermal conductivity preferably greater than about 110 $W/(m^2 K)$. Suitable materials with a relatively high thermal conductivity for use in manufacturing skimmer 150 include, without limitation, aluminum, copper, brass, and alloys created therefrom. With the usage of such materials for skimmer 150, leading section 151 extending into cyclone body 130, but radially offset from cyclone body 130, can be sufficiently heated by heater 155-3 via conductive heat transfer. Such heating of leading section 151 may be achieved without heating the remaining portions of skimmer 150 to a temperature which may damage biological agents. In some embodiments, the tip of leading section 151 can be heated to a temperature above 0° C. via conductive heat transfer from heater 155-3 through skimmer 150, without the temperature of skimmer 150 exceeding a temperature suitable for preserving important properties (e.g., viability, DNA integrity, etc.) of bioaerosol particles.

In the manner described, embodiments described herein offer the potential for several advantages over some conventional wetted wall cyclones. More specifically, the cyclone body (e.g., cyclone body 30) has a substantially uniform inner diameter (e.g., inner diameter $D_{30\text{-}i}$) proximal the skimmer (e.g., skimmer 50), thereby offering the potential to reduce the likelihood of flow stagnation and associated liquid carryover. In addition, the skimmer includes a reduced diameter leading section (e.g., reduced diameter leading section 51) at its leading edge, resulting in the formation of an annulus (e.g., annulus 80) between the skimmer and the cyclone body (e.g., cyclone body 30). The annulus is sized to result in sufficient air shear to drive the film or rivulets of hydrosol (e.g., hydrosol 90) into the annulus and towards the aspiration port (e.g., aspiration port 95) while the leading section shields the hydrosol from the bulk outlet airflow, thereby reducing likelihood of hydrosol stagnation proximal the skimmer, and thus, offering the potential for reduced liquid carryover. Further, embodiments of cyclone 100 described herein include a plurality of heaters (e.g., heaters 155) whose thermal output may be independently controlled according to the local turbulent heat transfer coefficients, thereby offering the potential to reduce hot and cold spots in the wetted wall cyclone system, which can prevent the collected bioaerosols from deleterious thermal effects and allow for use in a wider range of environmental conditions. Moreover, use of multiple heaters may reduce the total power required to heat the wetted wall cyclone system as compared to conventional systems employing a single heater. Still further, use of a skimmer comprising a relatively high-thermal conductivity material offers the potential to sufficiently heat the reduced diameter leading edge of the skimmer without overheating the skimmer, thereby reducing the likelihood of thermally damaging biological materials. Such high-thermal conductivity materials also offer the potential for reduced power consumption while maintaining a sufficient temperature of the skimmer.

To further illustrate various illustrative embodiments of the present invention, the following examples are provided.

Example 1

In a laboratory environment, a 100 L/min wetted wall cyclone (WWC) constructed and operated in accordance with the principles described herein was tested to characterize the aerosol-to-hydrosol collection efficiency and the concentration factor. For these experiments, seven particle sizes of bioaerosol particles comprised of spores of *Bacillus* atropheus (also known as BG) were generated and subsequently sampled with the WWC. The smallest aerosol size was obtained by atomizing a dilute suspension of BG spores in Phosphate Buffer Solution with 0.1% surfactant, Triton X100, (PBST), which after evaporation of the resulting droplets, provided aerosol particles comprised of single spores. The size of the single spores was approximately 1 μm aerodynamic diameter (AD). Larger particle sizes were formed by atomizing more concentrated suspensions of BG in PBST with an inkjet aerosol generator, which produces uniform droplets with a diameter of about 50 μm. When the water evaporated from these droplets, residual clusters of BG remaining had a size dependent on the initial concentration of BG in the bulk liquid. Through this approach, BG clusters with sizes from 2.2 to 8.6 μm aerodynamic diameter (AD) were generated.

The tests were conducted with the cyclone body and the sampled air at room temperature. During testing, the WWC and a filter sampler were operated sequentially, where the filters served as reference samples. The filter and the WWC alternately sampled the same aerosol and were operated for five minute time intervals. At the end of each five minute sampling period the cyclone was removed from the aerosol source and allowed to continue to operate for an additional two minutes to complete the washing process. At least four alternate filter and WWC replicates were collected for each particle size. The collection liquid for the WWC was PBST for which the effluent hydosol liquid flow rate collected from the WWC was an average of 0.115 mL/min. Subsequent to sampling of aerosol by the WWC and filter, aliquots of the WWC effluent hydrosol liquid were placed onto Trypicase Soy Agar (TSA) in petri dishes, while the filter samples were vortexed in PBST and aliquots of that produced hydrosol were also plated on TSA. After incubation, the colonies formed from single spore organism on the agar plates were enumerated, and both the aerosol-to-hydrosol collection efficiency and concentration factor were calculated.

The number of spores that grew into colonies on the agar were indicative of the number of spores sampled by the filter or aspirated from the WWC, whether the aerosol was comprised of single spores or clusters. Clusters of spores, when sampled with the WWC were dispersed into individual spores once entrained in the collection liquid; further, clusters of spores collected by the filter were disintegrated into individual spores when vortexed in the PBST. As a consequence, for both samples, the analysis was based on the number of individual spores collected during the sampling period. Since the same particle size was collected by both the WWC and the filter, and because both devices sampled all of the aerosol produced by a generator, the number of colonies is a direct measure of the number of particles sampled.

Where all of the aerosol was sampled by the filter or WWC, the aerosol-to-hydrosol collection efficiency for any size of particle was calculated from the ratio of the number of spores in the hydrosol effluent stream to the number of spores collected by the filter. Further, for a given particle size, the concentration factor was calculated from the product of the aerosol-to-hydrosol collection efficiency and the flow rate ratio, where the flow rate ratio was the air sampling flow rate (100 L/min) divided by the effluent hydrosol liquid flow rate (0.115×10-3 L/min).

Figure 8:
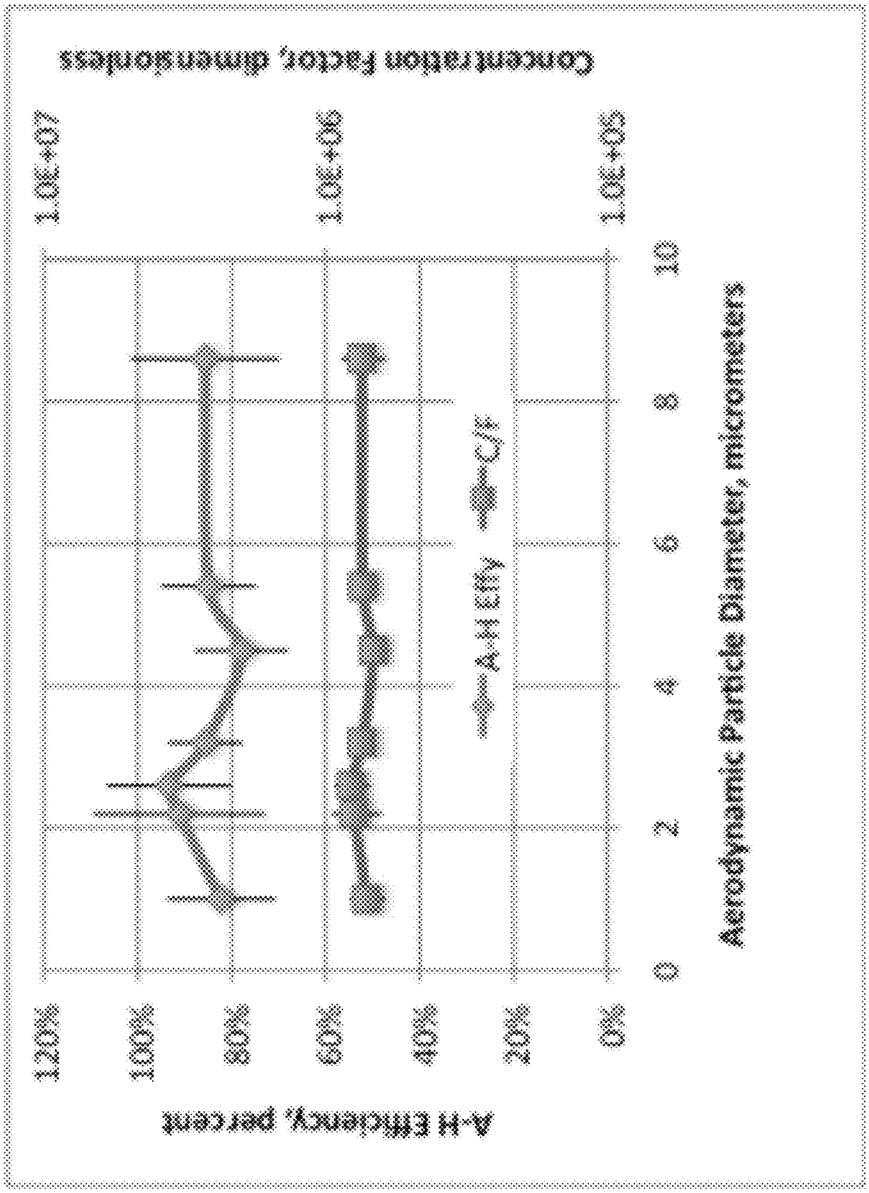
FIG. 8 is a graph illustrating the aerosol-to-hydrosol collection efficiency and concentration ratio of an embodiment of a wetted wall cyclone constructed in accordance with the principles described herein.

The aerosol-to-hydrosol collection efficiency and the concentration factor for tests of the 100 L/min WWC with the BG aerosols are shown as functions of test particle size in FIG. 8. Over the range of particle sizes from 1 to 8.6 μm AD, the average aerosol-to-hydrosol collection efficiency was 86%, and the average concentration factor was 750,000.

While preferred embodiments have been shown and described, modifications thereof can be made by one skilled in the art without departing from the scope or teachings herein. The embodiments described herein are exemplary only and are not limiting. Many variations and modifications of the system and apparatus are possible and are within the scope of the invention. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims.

What is claimed is:

1. A wetted wall cyclone comprising:

a cyclone body having a central axis and including an inlet end, an outlet end, and an inner flow passage extending therebetween, wherein the cyclone body has an inner surface defining an inner diameter;

a cyclone inlet tangentially coupled to the cyclone body proximal the inlet end, wherein the cyclone inlet includes an inlet flow passage in fluid communication with the inner flow passage of the cyclone body;

a skimmer extending coaxially through the outlet end of the cyclone body, wherein the skimmer comprises an upstream end disposed within the cyclone body, a downstream end distal the cyclone body, and an inner exhaust passage extending between the upstream end and the downstream end, wherein the inner exhaust passage is in fluid communication with the inner flow passage of the cyclone body;

a first annulus positioned radially between the upstream end of the skimmer and the outlet end of the cyclone body, wherein the first annulus has a radial width $W_1$ between 3% and 15% of the inner diameter of the cyclone body.

2. The wetted wall cyclone of claim 1 wherein the skimmer further comprises a recessed section axially spaced from the upstream end and radially spaced from the cyclone body by a second annulus having a radial width $W_2$ that is less than the radial width $W_1$.

3. The wetted wall cyclone of claim 2 wherein the radial width $W_2$ is between 0.15% and 2.5% of the inner diameter of the cyclone body.

4. The wetted wall cyclone of claim 2 wherein the radial width $W_1$ is between 4% and 10% of the inner diameter of the cyclone body.

5. The wetted wall cyclone of claim 2 wherein the radial width $W_1$ is at least 0.03 inches.

6. The wetted wall cyclone of claim 2 wherein the recessed section comprises an annular groove in fluid communication with the first and the second annulus, and an aspiration port extending radially through the cyclone body.

7. The wetted wall cyclone of claim 2 further comprising:

a collection liquid injector coupled to the cyclone inlet, wherein the collection liquid injector delivers a stream of a collection liquid into the inlet flow passage;

a compressed gas injector coupled to the cyclone inlet, wherein the compressed gas injector delivers a stream of a compressed gas into the inlet flow passage to atomize the collection liquid.

8. The wetted wall cyclone of claim 7 wherein the collection liquid comprises water and glycerol.

9. The wetted wall cyclone of claim 8 wherein the collection liquid comprises less than 30% glycerol by volume.

10. The wetted wall cyclone of claim 7 wherein the collection liquid comprises egg ovalbumin.

11. The wetted wall cyclone of claim 7 wherein the collection fluid comprises a mixture of water and a surfactant, wherein the mixture is between 0.005% and 0.5% surfactant by volume.

12. The wetted wall cyclone of claim 1 further comprising:

a first heater coupled to the outside of the cyclone body proximal the inlet end; and a second heater coupled to the outside of the skimmer.

13. The wetted wall cyclone of claim 12 wherein the skimmer comprises a material having a thermal conductivity greater than 110 $W/m^2K$.

14. The wetted wall cyclone of claim 12 further comprising an elongate vortex finder coupled to the inlet end of the cyclone body and extending coaxially into the inner flow passage of the cyclone body, wherein the vortex finder comprises a third heater.

15. The wetted wall cyclone of claim 14 wherein the first heater is coupled to at least a portion of the cyclone inlet.

16. The wetted wall cyclone of claim 15 further comprising a fourth heater coupled to the cyclone body proximal the outlet end of the cyclone body.

17. The wetted wall cyclone of claim 1 wherein the inner surface of the cyclone body is oriented at an angle $\alpha$ between −6° and 6° relative to the central axis.

18. The wetted wall cyclone of claim 17 wherein the inner diameter of the cyclone body is substantially uniform within an axial distance D of the upstream end of the skimmer, wherein the distance D is at least 50% of the inner diameter of the cyclone body at the upstream end of the skimmer.

19. The wetted wall cyclone of claim 18 wherein the thermal output of each of the heaters is independently controlled.

20. A wetted wall cyclone comprising:

a cyclone body having a central axis and including an inlet end, an outlet end, and an inner flow passage extending therebetween;

a cyclone inlet tangentially coupled to the cyclone body proximal the inlet end, wherein the cyclone inlet includes an inlet flow passage in fluid communication with the inner flow passage of the cyclone body;

a skimmer extending coaxially through the outlet end of the cyclone body, wherein the skimmer comprises an upstream end disposed within the cyclone body, a downstream end distal the cyclone body, and an inner exhaust passage extending between the upstream end and the downstream end, wherein the inner exhaust passage is in fluid communication with the inner flow passage of the cyclone body, wherein the skimmer comprises a material having a thermal conductivity greater than 110 $W/m^2K$;

a first heater coupled to the outside of the cyclone body proximal the inlet end; and a second heater coupled to the outside of the skimmer.

21. The wetted wall cyclone of claim 20 further comprising an elongate vortex finder coupled to the inlet end of the cyclone body and extending coaxially into the inner flow passage of the cyclone body, wherein the vortex finder comprises a third heater.

22. The wetted wall cyclone of claim 21 further comprising a fourth heater coupled to the cyclone body proximal the outlet end of the cyclone body.

23. The wetted wall cyclone of claim 22 wherein the thermal output of each of the heaters is independently controlled.

24. The wetted wall cyclone of claim 21 further comprising:

a collection liquid injector coupled to the cyclone inlet, wherein the collection liquid injector delivers a stream of a collection liquid into the inlet flow passage;

a compressed gas injector coupled to the cyclone inlet, wherein the compressed gas injector delivers a stream of a compressed gas into the inlet flow passage to atomize the collection liquid into droplets.

25. The wetted wall cyclone of claim 24 wherein the droplets have a diameter of at least 40 μm.

26. The wetted wall cyclone of claim 24 wherein the collection liquid comprises water and glycerol.

27. The wetted wall cyclone of claim 26 wherein the collection liquid is about 30% glycerol by volume.

28. The wetted wall cyclone of claim 20 wherein the first heater is coupled to at least a portion of the cyclone inlet.

29. A method of separating particles having a size within a predetermined range of aerodynamic diameters from an aerosol including particular matter, the method comprising:

(a) flowing the aerosol into a wetted wall cyclone, wherein the wetted wall cyclone comprises:

a cyclone body having a central axis and including an inlet end, an outlet end, and an inner flow passage extending therebetween, wherein the cyclone body has an inner surface defining the inner flow passage;

a cyclone inlet tangentially coupled to the cyclone body proximal the inlet end, wherein the cyclone inlet includes an inlet flow passage in fluid communication with the inner flow passage of the cyclone body; and a skimmer extending coaxially through the outlet end of the cyclone body, wherein the skimmer comprises an upstream end disposed within the cyclone body, a downstream end distal the cyclone body, and an inner exhaust passage extending between the first and the second ends, wherein the inner exhaust passage is in fluid communication with the inner flow passage of the cyclone body;

(b) injecting a collection liquid into the inlet flow passage;

(c) atomizing the collection liquid into a mist;

(d) entraining a first portion of the particulate matter in the collection liquid to form a hydrosol;

(e) heating the cyclone body with a first heater coupled to the cyclone body;

(f) heating the skimmer with a second heater coupled to the skimmer;

(g) controlling the temperature of the cyclone body and the skimmer independent of each other.

30. The method of claim 29 further comprising:

(h) flowing the hydrosol axially along the inner surface of the cyclone body into a first annulus radially disposed between the upstream end of the skimmer and the outlet end of the cyclone body.

31. The method of claim 30 wherein the inner surface defines an inner diameter of the cyclone body, and wherein the first annulus has a radial width $W_1$ between 3% and 15% of the inner diameter of the cyclone body.

32. The method of claim 29 wherein (a) through (g) are performed in an environment having an ambient temperature less than 0° C.

33. The method of claim 32 further comprising maintaining the temperature of the collection liquid above its freezing temperature in (a) through (g).

34. The method of claim 33 wherein the collection liquid comprises water and glycerol.

35. The method of claim 34 wherein the collection liquid comprises at least 30% glycerol by volume.

36. The method of claim 33 wherein the mist includes droplets of collection liquid having an aerodynamic diameter of at least 40 μm.

37. The method of claim 36 wherein the first portion of the particulate matter includes bio-organisms.

38. The method of claim 37 wherein the collection liquid comprises egg ovalbumin.

39. The method of claim 33 further comprising:

heating a vortex finder extending coaxially into the inner flow passage of the cyclone body with a third heater; and controlling the temperature of the vortex finder with the third heater independent of the first and second heaters.

40. The method of claim 29 further comprising:

(h) collecting the hydrosol;

wherein the hydrosol has a first number concentration of particles having a size within the predetermined range of aerodynamic diameters and the aerosol has a second number concentration of particles having a size within the predetermined range of aerodynamic diameters, wherein the ratio of the first number concentration to the second number concentration is at least 500,000.

41. The method of claim 33 wherein (e) and (f) comprise maintaining the temperature of cyclone body and the skimmer above the freezing temperature of the collection liquid and below about 50° C.

* * * * *